No. 707,453. Patented Aug. 19, 1902.
R. W. SCOTT.
SHAFT COUPLING.
(Application filed June 23, 1902.)
(No Model.)

Witnesses:—

Inventor:—
Robert W. Scott
by his Attorneys:—

UNITED STATES PATENT OFFICE.

ROBERT W. SCOTT, OF PHILADELPHIA, PENNSYLVANIA, ASSIGNOR OF ONE-HALF TO LOUIS N. D. WILLIAMS, OF ASHBOURNE, PENNSYLVANIA.

SHAFT-COUPLING.

SPECIFICATION forming part of Letters Patent No. 707,453, dated August 19, 1902.

Application filed June 23, 1902. Serial No. 112,912. (No model.)

*To all whom it may concern:*

Be it known that I, ROBERT W. SCOTT, a citizen of the United States, residing in Philadelphia, Pennsylvania, have invented certain Improvements in Shaft-Couplings, of which the following is a specification.

My invention relates to that class of shaft-couplings which comprise a split sleeve encircling the meeting ends of the shafts to be coupled and provided with means for compressing said sleeve upon the shafts, the object of my invention being to so construct such a coupling as to provide for a better frictional hold of the sleeve upon the shafts than is possible with previous couplings of this type with which I am familiar. This object I attain in the manner hereinafter set forth, reference being had to the accompanying drawings, in which—

Figure 1:
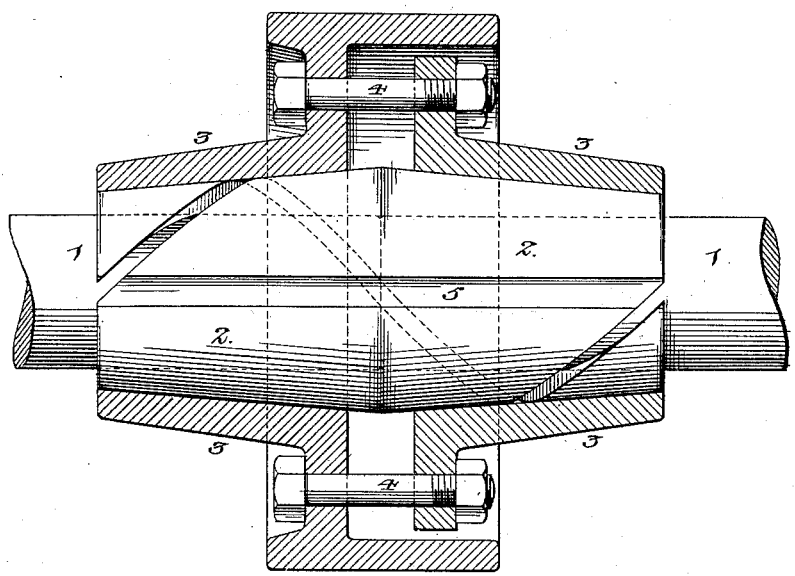
Figure 2:
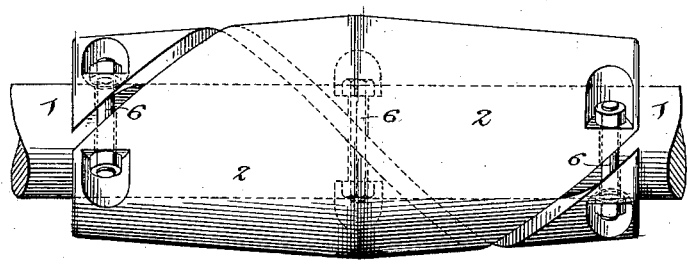

Figure 1 is a view, partly in elevation and partly in longitudinal section, of a shaft-coupling constructed in accordance with my invention; and Fig. 2 is a side elevation of another form of coupling embodying the invention.

In Fig. 1 of the drawings, 1 1 represent the meeting ends of a pair of shafts which have to be coupled, and 2 is a coupling-sleeve which encircles said meeting ends of the shafts and presents an exterior surface of double-cone formation, the bases of the cones or portion of greatest diameter of the sleeve being at the center of the same.

Surrounding the sleeve 2 are a pair of compression-cones 3, which may be provided with any ordinary means for drawing or forcing them together, the means shown in the present instance being bolts 4, which pass through openings in flanges on the cones and have heads bearing upon the flange of one cone and nuts bearing upon the flange of the other cone.

The coupling-sleeve 2 has formed in it a spiral slot, which may form any desired number of convolutions, but which at least substantially encircles the shaft, so that when radial compression is exerted upon the sleeve by the compression-cones said sleeve will be tightened upon the shafts uniformly throughout its entire length and a firm and uniform grip of all portions of the sleeve upon said shaft will result, whereby a much better hold of the coupling is insured than in couplings of that class in which the sleeve is split in a longitudinal or substantially longitudinal direction and in which the movement of the parts of the sleeve from and toward the shaft resembles movement upon a hinge or pivot instead of a uniform movement throughout all parts of the clamping-surface. The pitch of the spiral slot is by preference always such that the frictional hold of the rotating shaft upon the sleeve tends to tighten the same.

The coupling-sleeve shown in Fig. 1 has an uninterrupted longitudinal portion between the ends of the slot, in which portion a key-seat 5 can be formed, so as to provide a firm bearing for such key.

In that form of my improved coupling shown in Fig. 2 the compression-cones are dispensed with and compressing screws or bolts 6 are employed, these screws or bolts passing through openings formed in the sleeve and having bearing on shouldered portions of the sleeve on opposite sides of the slot, the openings being slightly larger than the bolts to permit of movement or creep of one portion of the sleeve in respect to the other as the slot is expanded or contracted.

My invention relates to couplings of the compression type and is distinct from those of the torsional type, which consist of a strip or band coiled around a shaft or shafts and tightened upon the same by reversely moving the opposite ends of the coil.

Having thus described my invention, I claim and desire to secure by Letters Patent—

1. A shaft-coupling comprising a sleeve having therein a spiral slot substantially encircling the same, in combination with means for compressing said sleeve so as to tighten the same upon the shafts to be coupled.

2. A shaft-coupling consisting of a sleeve having a spiral slot substantially encircling the same and having an exterior double-cone formation in combination with a pair of compressing-cones acting upon said sleeve, substantially as specified.

3. A shaft-coupling consisting of a sleeve having therein a spiral slot substantially encircling the same and having between the ends of said slot a substantially uninterrupted longitudinal portion with key-seat formed therein, in combination with means for compressing the sleeve, substantially as specified.

In testimony whereof I have signed my name to this specification in the presence of two subscribing witnesses.

ROBERT W. SCOTT.

Witnesses:
F. E. BECHTOLD,
JOS. H. KLEIN.